April 17, 1962    H. W. EARHART ET AL    3,030,427
PREPARATION OF BIS-HYDROXYMETHYL-DURENE
Filed July 14, 1959
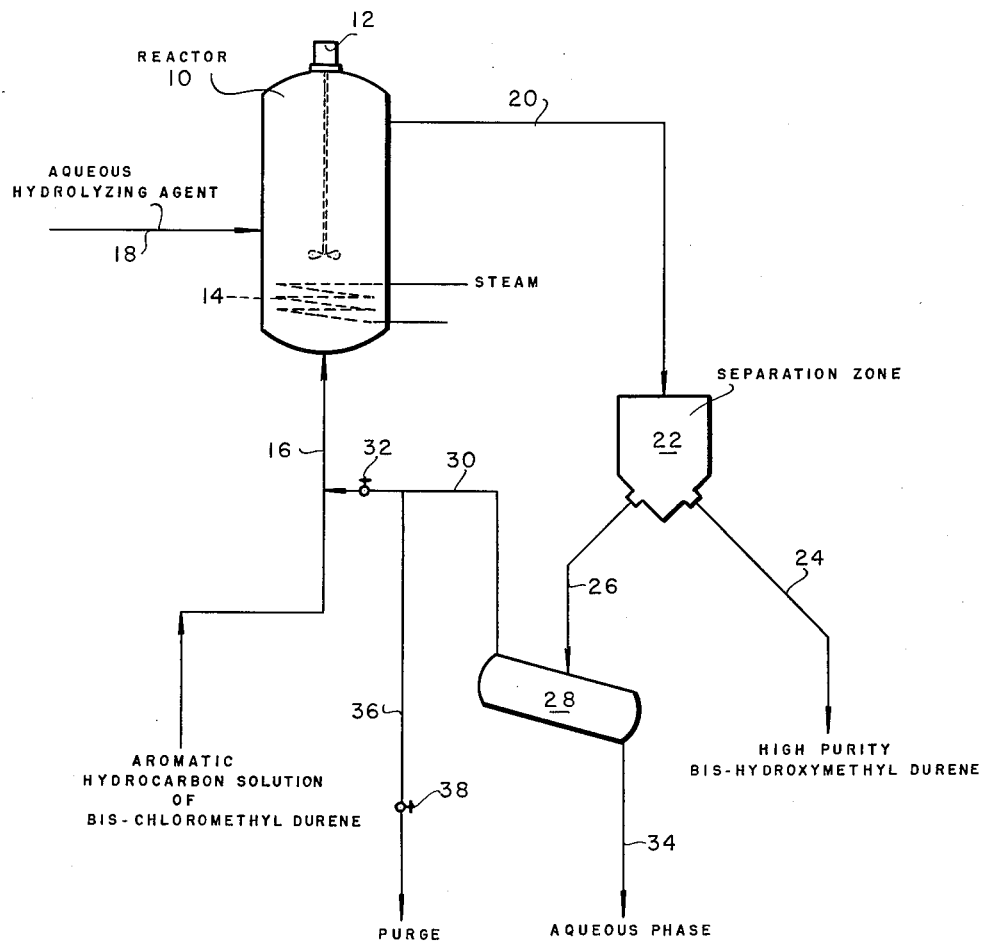
INVENTORS.
WILLIAM G. DePIERRI,
HAROLD W. EARHART,
BY
*Carl G. Ries*
ATTORNEY.

3,030,427
PREPARATION OF BIS-HYDROXYMETHYL-
DURENE
Harold W. Earhart and William G. De Pierri, Jr., Baytown, Tex., assignors, by mesne assignments, to Esso Research and Engineering Company, Elizabeth, N.J., a corporation of Delaware
Filed June 14, 1959, Ser. No. 827,084
6 Claims. (Cl. 260—618)

This invention relates to a method for the preparation of bis-hydroxymethyl-durene. More particularly, this invention relates to an improved method for the preparation of high purity bis-hydroxymethyl-durene from bis-chloromethyl-durene.

Bis-hydroxymethyl-durene is a valuable raw material for the preparation of a wide variety of useful materials such as polyesters, plasticizers, etc. When it is desired to prepare this material from bis-chloromethyl-durene, however, serious problems are encountered with respect to the preparation of a high purity product because of the similarity in molecular configuration of bis-hydroxymethyl-durene and bis-chloromethyl-durene, as illustrated by the following structural formulae:

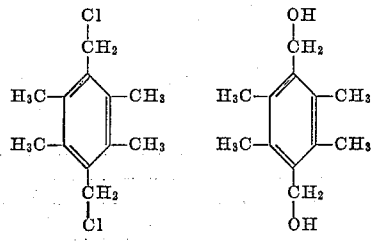

Bis-chloromethyl-durene    Bis-hydroxymethyl-durene

In addition, bis-hydroxymethyl-durene has a high melting point and is therefore difficult to distill. Moreover, the compound has a very limited solubility whereby purification by recrystallization is difficult.

In accordance with the present invention, high purity bis-hydroxymethyl-durene is conveniently prepared from bis-chloromethyl-durene by hydrolyzing bis-chloromethyl-durene with an aqueous alkali in the presence of a solvent selected from the group consisting of benzene, toluene, ethylbenzene, and mixtures thereof at a temperature within the range of about 60° to 200° C., whereby high purity bis-hydroxymethyl-durene is formed and selectively precipitated (crystallized).

The invention will be further illustrated in connection with the accompanying drawing which is a schematic flow chart illustrating a preferred method for practicing the process of the present invention.

Turning now to the drawing, there is schematically shown a reactor 10 which is preferably equipped with suitable agitating means such as an impeller 12 and suitable heating means such as a steam coil 14.

A solution of bis-chloromethyl-durene in an aromatic hydrocarbon solvent selected from the group consisting of benzene, toluene, and ethylbenzene is charged to reactor 10 by way of a charge line 16. The amount of solvent that is used in preparing this solution is not particularly critical, provided only that an amount of solvent is used which is sufficient to substantially completely retain the bis-chloromethyl-durene in the solution at the hydrolysis temperature employed.

An aqueous solution of a suitable hydrolyzing agent such as an alkali metal or alkaline earth metal hydroxide (e.g., sodium or potassium hydroxide) is charged to the reactor 10 by way of a charge line 18.

Within the reactor 10 the hydrolyzing agent is reacted with the bis-chloromethyl-durene at at suitable hydrolyzing temperature within the range of about 60° to 200° C. Reaction time may be within the range of about 1 minute to 10 hours but is preferably within the range of about 1 to 60 minutes. The reaction is preferably conducted at a pressure sufficient to maintain the reaction mixture in liquid phase (e.g., 1 to 20 atmospheres).

As a consequence, at least a portion of the bis-chloromethyl-durene is hydrolyzed to bis-hydroxymethyl-durene which selectively precipitates. The reaction mixture, however, will normally contain some unreacted bis-chloromethyl-durene together with partial bis-chloromethyl-durene hydrolysis products.

A product stream is withdrawn from reactor 10 by way of discharge line 20 leading to a separation zone such as centrifugation zone 22 where crystals of high purity bis-hydroxymethyl-durene are separated from the reaction mixture. It will be understood that the zone 22 will be equipped with suitable means for washing the filter cake with water or aromatic hydrocarbon solvent or both prior to discharge. The washed crystals, consisting essentially of bis-hydroxymethyl-durene, are discharged by way of conduit 24. They may be used directly and without further treatment because of their high purity (95% or more).

The liquid phase is discharged from the zone 22 by way of a discharge line 26 leading to a settling zone, such as drum 28, wherein phase separation occurs whereby an aqueous phase separates from an oil phase.

The oil phase is discharged by way of a discharge line 30 controlled by a valve 32 for recycle to the reaction zone 10. Recycle is advantageous inasmuch as the oil phase will normally contain unreacted and partially hydrolyzed bis-chloromethyl-durene. The aqueous phase is discarded by way of line 34.

In conducting the recycle operation, it is generally preferable to discharge a portion of the oil phase by way of a purge line 36 controlled by valve 38 in order to prevent an excessive build-up of by-products in reaction zone 10.

It will be understood that discard streams 34 and 36 may be treated in a suitable manner (not shown) to recover hydrolyzing agent, solvent, etc. therefrom.

The invention will be further illustrated by the following specific examples which are given by way of illustration and not by way of limitation on the scope of this invention.

*Example I*

There was charged to a jacketed reactor equipped with an agitator about 250 grams of bis-chloromethyl-durene of 97 percent purity, 1000 ml. of toluene and 3500 ml. of an aqueous 12 percent solution of sodium hydroxide.

The reaction mixture was heated as rapidly as possible with agitation to a temperature of about 310° F. and maintained at this temperature for about 7 hours. Samples of the reaction mixture were obtained after 5 and 7 hours of reaction time.

Each of the sample was cooled and permitted to settle into an oil phase and an aqueous phase. In each case the crystals contained in the oil phase were recovered by filtration, washed with water, and dried.

The melting point of the recovered precipitate from the 5-hour sample was found to have a melting point of 255–260° C. This demonstrates that the product was of high purity inasmuch as pure bis-hydroxymethyl-durene has a melting point of 258–260° C.

The recovered crystals from the 7-hour sample were mixed with pure bis-hydroxymethyl-durene (melting point 258–260° C., softening point 254° C.) and a mixed melting point was obtained which was found to be 254–258° C. This is again demonstrative of the purity of the bis-hydroxymethyl-durene obtained with the process of the present invention.

The 7-hour sample was subjected to a carbon, hydrogen analysis with the following result. Found: C, 74.83%; H, 9.34%. Calcd. for $C_{12}H_{18}O_2$: C, 74.19; H, 9.34.

The 5-hour sample was analyzed and was found to contain only 0.04% of chlorine.

*Example II*

Repeat Example I with only one exception; substitute ethylbenzene for toluene. Substantially the same results are obtained.

*Example III*

Repeat Example I but in this instance substitute benzene for toluene. Again, substantially the same results are obtained.

*Example IV*

Repeat Example I but in this instance utilize m-xylene as the solvent. When this is done, unsatisfactory results are obtained due to inter-reaction of the bis-chloromethyl-durene with the m-xylene to provide high molecular weight intercondensation products which contaminate the bis-hydroxymethyl-durene.

What is claimed is:

1. A method which comprises the steps of hydrolyzing bis-chloromethyl-durene with an aqueous hydrolyzing agent at a temperature within the range of about 60° to 200° C. in the presence of an amount of solvent sufficient to maintain said bis-chloromethyl-durene and partial hydrolysis products thereof substantially completely in solution, said solvent being selected from the group consisting of benzene, toluene, ethylbenzene and mixtures thereof, whereby bis-hydroxymethyl-durene is formed and selectively crystallized and recovering said crystallized bis-hydroxymethyl-durene.

2. A method which comprises the steps of contacting bis-chloromethyl-durene with an aqueous alkaline hydrolyzing agent in the presence of an amount of a solvent selected from the group consisting of benzene, toluene, ethylbenzene and mixtures thereof sufficient to maintain said bis-chloromethyl-durene and partial hydrolysis products thereof in solution at a temperature within the range of about 60° to 200° C. for a time within the range of about 1 to 60 minutes to thereby hydrolyze a portion of said bis-chloromethyl-durene to bis-hydroxymethyl-durene, whereby said bis-hydroxymethyl-durene is selectively crystallized from said solution, and recovering said crystallized bis-hydroxymethyl-durene.

3. A method which comprises the steps of continually charging a solution of bis-chloromethyl-durene in a solvent selected from the group consisting of benzene, toluene, ethylbenzene and mixtures thereof to a reaction zone, continually charging an aqueous solution of sodium hydroxide to said reaction zone, maintaining said reaction zone at a temperature within the range of about 60° to 200° C., said solvent being employed in an amount sufficient to maintain said bis-chloromethyl-durene and partial hydrolysis products thereof in solution at said temperature, continually withdrawing a product stream from said reaction zone, continually separating said product stream into crystallized bis-hydroxymethyl-durene and a liquid phase, recovering said crystallized bis-hydroxymethyl-durene, separating said liquid phase into an aqueous phase and an oil phase containing unreacted bis-chloromethyl-durene and partial hydrolysis products thereof, and continually recycling at least a portion of said oil phase to said reaction zone.

4. A method as in claim 3 wherein the solvent is toluene.

5. A method as in claim 3 wherein the solvent is benzene.

6. A method as in claim 3 wherein the solvent is ethylbenzene.

References Cited in the file of this patent

UNITED STATES PATENTS

| | | |
|---|---|---|
| 2,500,599 | Bergsteinsson et al. | Mar. 14, 1950 |
| 2,806,883 | Mikeska et al. | Sept. 17, 1957 |
| 2,873,299 | Mikeska et al. | Feb. 10, 1959 |

OTHER REFERENCES

Rhoad et al.: Jour. Amer. Chem. Soc., vol. 72 (1950), 2216–2219 (4 pages).